Patented Oct. 19, 1937

2,096,661

UNITED STATES PATENT OFFICE 2,096,661

ESTER GUM COMPOSITIONS

Herbert A. Winkelmann, Chicago, Ill., assignor to Marbon Corporation, a corporation of Delaware No Drawing. Application March 20, 1936, Serial No. 69,881

9 Claims. (Cl. 106—23)

This invention relates to an improvement in coating compositions.

It is an object of this invention to provide a coating composition which is highly resistant to acids, alkalis, and other corrosive materials.

It is a further object to provide a corrosion resistant lacquer or paint which is firmly adherent to metal surfaces.

Another object is to provide an ozone, and corrosion resistant flexible covering for rubber articles.

Other objects will become apparent from the following specification and appended claims.

Coating compositions in accordance with this invention will contain essentially hydrochlorinated rubber and an ester gum such as, for example, esters of abietic acid, particularly alkyl and aralkyl derivatives.

The rubber hydrochloride may be saturated or partially saturated, crystalline type or amorphous soluble non-gelling type. The preferred rubber hydrochloride is a substantially saturated addition product of rubber and hydrogen chloride of the amorphous soluble, non-gelling type, having approximately 28 to 30% chlorine content. It may be made by reacting thin sheets of rubber with liquefied hydrogen chloride at −85° C. The rubber used in making rubber hydrochloride may be milled or unmilled, unvulcanized, vulcanized, smoked sheet, pale crepe, reclaim, scrap or equivalent rubbers such as gutta percha and balata. The preferred rubber is a milled pale crepe.

Various ester gums may be used in the compositions. Ester gums as used in this specification and claims are compounds of abietic or other resin acids with glycerine or other polyhydric alcohols, and include the modified types which, for example, contain fatty acids either saturated or unsaturated, and also include the hydrogenated ester gums.

Various ingredients in addition to rubber hydrochloride and alkyd resins may be included in the compositions of this invention as, for example, gums or resins as alkyd resins, chlorinated diphenyls, coumarone, phenol-formaldehyde condensation resins, polyvinyl esters, polystyrene, shellac, copal etc., colors and pigments or fillers; heat stabilizers such as magnesium oxide, lead oxide; age resistors such as oximes, hexamethylene tetramine; plasticizers such as butyl stearate, dibutyl phthalate, chlorinated paraffin, oils such as tung oil, linseed oil, castor oil and other ingredients which may be desirable and which are compatible with the rubber hydrochloride and ester gum.

Any suitable solvent or solvent mixture may be used in the preparation of the fluid coating compositions of this invention. Benzol, ethylene dichloride, toluene, carbon tetrachloride, chloroform, xylene, dichlorodimethylether, hydrogenated naphthas etc. may be used. The mixtures may be made by agitation with solvents or by milling of the materials without solvents followed by agitation with the solvents. It is preferred to mill the rubber hydrochloride since by this means the viscosity is greatly reduced. In the compounding of compositions in accordance with this invention the essential ingredients may be used in widely varying proportions, and other ingredients which may be included may likewise be used in widely varying proportions. The amount and type of material however, should be varied in accordance with the particular use of the coating compositions.

For general corrosion resistant coatings the rubber hydrochloride in a solvent, for example, may be used in amount within say, about 5 to 25%, while an alkyd resin may be included within say about 2 to 40%. The solvent may be used in any amount with consideration for the fluidity desired for the composition. Thus, for example, the solvent may be used in amount within say, the range 90–40% to give compositions which may be readily applied as by brushing, spraying, dipping or the like. Where crystalline rubber hydrochloride is used the solutions must generally be applied hot, as the crystalline rubber hydrochloride, which is the ordinary rubber hydrochloride made by passing hydrogen chloride into solutions of rubber, is soluble in cold benzol only to the order of about 1%, and even when heated the solutions of, for example 10%, are viscous and gel quickly on cooling, and in some instances simply on standing. For this reason ordinary or crystalline rubber hydrochloride is not preferred except where high turpentine resistance is essential. The amorphous, soluble, non-gelling type is readily soluble in cold benzol to above 8%, and by milling where can be obtained 40% solutions in cold benzol, and even higher, which remain in their fluid state. It is, therefore, the preferred rubber hydrochloride of this invention. Its chief disadvantage is its low resistance to turpentine and its lesser resistance to certain oils when compared to rubber chlorides and ordinary crystalline rubber hydrochloride. Its greater inherent flexibility, its higher resistance to acids and its greater stability under temperature changes and light rays than rubber chloride give it an advantage over this material in lacquer while the greater solubility and non-gelling characteristics give it a marked advantage over ordinary rubber hydrochloride.

The ester gum resins as a class, combine with rubber hydrochloride to give products having superior characteristics to either the rubber hydrochloride or the ester gum. The new compositions have superior adherence to metal, and increased resistance to water than straight rubber hydrochloride. The addition of ester gums also increases the resistance of amorphous rubber hydrochloride to turpentine, lubricating oils and the like. The use of rubber hydrochloride with the ester gum resins, on the other hand, gives a coating of superior flexibility and toughness.

As an illustration of the practical adaption of this invention, for example, satisfactory compositions for various uses may be made by the following formulae:

Example I

The following is a formula which is particularly adapted for coating metals to protect against acids, alkalis and bleaching compounds:

|  | Preferred | Range |
| --- | --- | --- |
| Rubber hydrochloride | 10 | 10 |
| Ester gum | 10 | 5–15 |
| Hydrogenated naphtha | 50 | 50 |
| Toluol | 50 | 50 |

The softer type of solid ester gum such as Imperial ester gum #8, from John D. Lewis; ester gum #125 from American Cyanamid and synthecopal ester gum from Beck Kohler give good results. A small amount of plasticizer such as dibutyl phthalate, hydrogenated methyl abietate etc. may be used. Improved resistance to acids may be obtained by adding acid resistant pigment such as titanium dioxide, iron oxide, etc. Soluble phenol-formaldehyde resins such as amberol 801 may also be used with the ester gum, and may replace the hard ester gums to some extent, particularly when used with a hydrogenated ester gum. Drying oils such as tung oil and linseed oil may be incorporated but are not essential.

Example II

The following is a formula which is particularly adapted for coating metals to protect against salt spray:

Rubber hydrochloride _____ 10
Ester gum _____ 20–50
Solvent _____ 100

The ester gum is preferably a hard, high melting type.

Example III

The following is a formula for a coating composition particularly adapted for coating on flexible rubber surfaces:

|  | Preferred | Range |
| --- | --- | --- |
| Rubber hydrochloride | 10 | 20 |
| Hydrogenated ethyl abietate | 4 | 3–6 |
| Hydrogenated naphtha | 50 | 50 |
| Toluol | 50 | 50 |

In order to build up the solid content of the lacquer and at the same time eliminate the use of hard ester gums or other hard resins, it is advisable to mill amorphous rubber hydrochloride for about fifteen minutes in the presence of a basic stabilizer such as 3 parts by weight of magnesium oxide per 100 parts of the rubber hydrochloride. This amorphous milled and stabilized rubber hydrochloride will give high concentrations of relatively low viscosity compared to unmilled rubber hydrochlorides. Such low viscosity rubber hydrochlorides are described in greater detail and broadly claimed in the copending application of Herbert A. Winkelmann, S. N. 25,807, filed June 10, 1935. The hydrogenated abietic acid esters of the group alkyl and aralkyl esters are superior types of plasticizers for rubber hydrochlorides and seem to be exceptionally so for the amorphous rubber hydrochloride. The combination of milled amorphous rubber hydrochloride and hydrogenated ester gums in high concentration of total solids gives a lacquer which may be sprayed on rubber surfaces and which will dry to a high gloss, flexible coating, which does not check on bending or stretching the rubber.

The compositions of rubber hydrochloride and ester gum may be applied to various surfaces in addition to metal and flexible rubber, as for example, hard rubber, wood, paper, glass, and the like, by spraying, brushing, dipping, etc. and on evaporation of the volatile ingredients will form a coating having excellent adherence to the surface, of good appearance, flexibility, stability, etc., and a very high resistance to corrosion.

The compositions are particularly adapted for obtaining a coating on metal surfaces such as pipes which are buried underground or exposed to acid fumes, or as a protective coating on battery boxes and covers.

Another important application of the composition is as a high gloss transparent coating on paper containing printed matter. For this purpose the coating solutions should contain a high amount of total solids as for example above 12%, or about 25%. The ester resin also should be present in quantity amounting to more than half the amount of solids.

The term amorphous rubber hydrochloride as used in the specification and appended claims refers to the physical structure of the rubber hydrochloride as determined by X-ray analysis. The amorphous rubber hydrochlorides are further characterized by being readily soluble in benzol at normal room temperature to above 5% and forming stable or non-gelling sols in concentrations in which crystalline rubber hydrochlorides quickly gel. Rubber chlorides and rubber hydrochlorides produced at room temperatures or higher, or from rubber solutions are crystalline according to X-ray analysis. Although concentrated non-gelling solutions of rubber chloride comparable to amorphous rubber hydrochloride solutions may be produced, the solutions are less stable and less resistant to corrosion than rubber hydrochloride solutions. The amorphous rubber hydrochloride solutions have the advantages of rubber solutions without their disadvantage of unsaturation, poor oil resistance, and poor ozone resistance. The amorphous rubber hydrochloride is described in greater detail, and claimed broadly in the application of Gebauer-Fuelnegg and Moffett, S. N. 30,515, filed July 9, 1935.

Rubber hydrohalides as used in the specification and appended claims are addition products of rubber and a hydrogen halide. Mixtures of rubber hydrohalides and rubber halides may be used; also halogenated rubber hydrohalides may be used for the production of ester-gum lacquers but in general the presence of compounds having substituted chlorine, such as in rubber chloride, is detrimental and such compounds should be avoided.

I claim:

1. A composition of matter comprising a rubber hydrohalide and an ester gum.

2. A coating composition comprising a rubber hydrochloride, and an abietic acid ester and a solvent.

3. A composition comprising amorphous rubber hydrochloride and an ester gum.

4. A coating composition comprising amorphous rubber hydrochloride about 5 to 25%, an abietic acid ester of about 2 to 40% of the group alkyl and aralkyl esters, and a solvent.

5. In combination a surface and a film containing rubber hydrochloride and an ester gum.

6. In combination a metal surface, and a film containing a rubber hydrochloride and an ester gum.

7. In combination a paper surface, and a film containing a rubber hydrochloride and an ester gum.

8. In combination a rubber surface, and a film containing rubber hydrochloride and an ester gum.

9. A composition of matter comprising in intimate admixture a rubber hydrochloride and glyceryl abietate.

HERBERT A. WINKELMANN.